United States Patent [19]

Ferrand

[11] Patent Number: 4,813,178

[45] Date of Patent: Mar. 21, 1989

[54] TUBULAR ELEMENT FOR CULTIVATING PLANTS

[76] Inventor: Claude Ferrand, 263 Route de Bellet, 0600 Nice, France

[21] Appl. No.: 766

[22] Filed: Jan. 6, 1987

[30] Foreign Application Priority Data

Jan. 10, 1986 [FR] France .............................. 86 00406

[51] Int. Cl.⁴ ........................................... A01G 9/00
[52] U.S. Cl. ..................................................... 47/77
[58] Field of Search .................. 47/77, 73, 66, 84–87, 47/5.5; 220/4 E, 4 B

[56] References Cited

U.S. PATENT DOCUMENTS

| 3,052,062 | 9/1962 | Boyle | 47/5.5 |
|---|---|---|---|
| 3,195,272 | 7/1965 | Mosher et al. | 47/73 |
| 3,380,608 | 4/1968 | Morbeck | 220/4 E |
| 3,557,489 | 1/1971 | Ferrand | 47/87 |
| 3,987,956 | 10/1976 | Congleton | 229/28 R |
| 4,057,932 | 11/1977 | Spencer | 47/77 |
| 4,118,890 | 10/1978 | Shore | 47/84 |
| 4,216,622 | 8/1980 | Hollenbach | 47/70 |
| 4,369,599 | 1/1983 | Franclet et al. | 47/84 |
| 4,517,764 | 5/1985 | Dedolf | 47/74 |

FOREIGN PATENT DOCUMENTS

| 0021963 | 7/1981 | European Pat. Off. | 47/84 |
|---|---|---|---|
| 2176632 | 2/1973 | France | 47/66 |
| 2108813 | 5/1983 | United Kingdom | 47/5.5 |

Primary Examiner—James R. Feyrer
Attorney, Agent, or Firm—Sandler & Greenblum

[57] ABSTRACT

An open tubular element or container is designed for retaining plants, seedlings and dirt to enhance the cultivation and growth of plants and to automate the filling of containers with dirt and seedlings. The device includes two generally semi-cylindrical body sections, each of which has an upper integrally connected or separately attached semi-circular panel. Each of these panels includes a semi-circular opening and includes an upwardly extending semi-cylindrical funnel portion, so that when the semi-cylindrical body portions are joined to each other the semi-cylindrical funnel portions will form a cylindrical funnel which is coaxial and concentric with the outer periphery of said tubular body sections. A drainage opening is provided in a bottom panel and is formed by mating semi-circular openings in semi-circular panels attached to lower ends of each of said semi-cylindrical body sections. The lower opening is provided to drain water and other liquid outwardly from the bottom of the container. This tubular container provides for mechanizing both horizontal and vertical filling of the containers formed by the semi-cylindrical sections.

12 Claims, 1 Drawing Sheet

U.S. Patent
Mar. 21, 1989
4,813,178
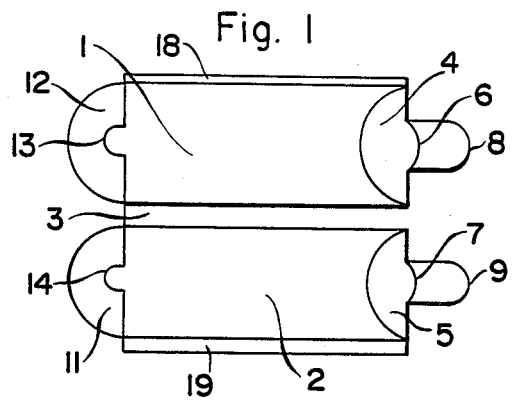
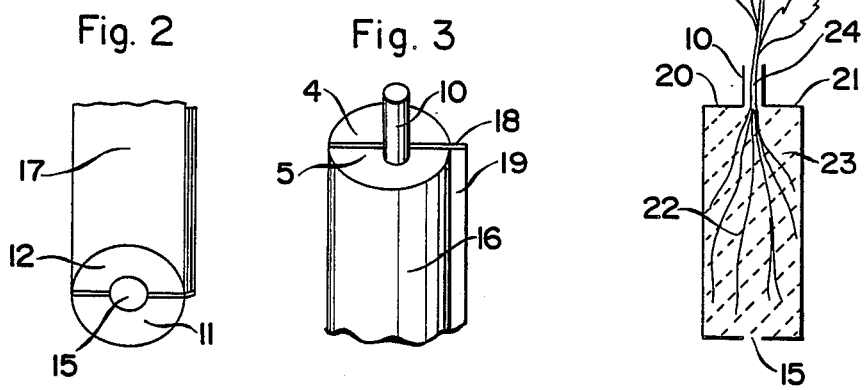
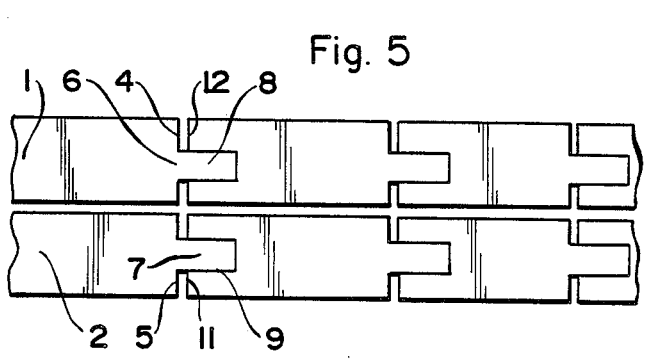

TUBULAR ELEMENT FOR CULTIVATING PLANTS

BACKGROUND OF THE DISCLOSURE

1. Field of the Invention

The present invention generally relates to plant containers and more specifically to open tubular plant containers which are adapted to improve plant cultivation and for automating the management of such plant cultivation. The tubular cultivating element of the present invention permits and enhances mechanized and automatic horizontal filling of the tubes, and protects the stems of growing plants by virtue of its specific contour.

2. Discussion of Prior Art

Numerous tubular elements exist for cultivating plants, but their structure and the way in which they are handled does not permit them to be automatically and-/or mechanically filled with dirt soil, or root media or seeds.

The present invention, to the contrary, overcomes such inconveniences and permits the tube to be filled by fertilizer compost or dirt and/or seeds and permits the tubes to be closed. The tubular elements have a contour which will serve such function and which will ensure the protection of developing plant stems against both external environmental forces and invasion by weeds and/or insects.

OBJECTS OF THE INVENTION

The present invention has as a general object the provision of a tubular cultivating container which can be automatically filled with dirt or soil, or root media and/or seeds and/or seedlings; and which, when in use, will protect plants and seedlings from the wind, rain, other environmental factors, and/or insects which might be detrimental to the growth of the plants inside.

SUMMARY OF THE INVENTION

The above and other objects, features and advantages of the present invention are provided for in a first aspect thereof by a combined apparatus which includes a unitary top panel and/or base panel, a tubular body element, and a substantially cylindrical funnel or collar having a complete opening which is generally axially concentric to the body element of the container. The panels, funnel, and body portions can be formed integrally, or can be formed separately and then attached to each other. These elements define the holding capacity of the apparatus, as well as one or more drainage openings located in a lower section of the tubular element for draining excess water from the element. The tubular element and the openings are formed when two half-shells, i.e., two substantially semi-circular tubular elements, are positioned about a filling axis which the cylindrical funnel also surrounds when assembled.

The present invention is provided for in a second aspect thereof by an open tubular element which is adapted to be used for the cultivation of tubular plants and which is adapted to be automatically filled with material for cultivation when horizontally positioned. The tubular element comprises two substantially similar semi-cylindrical tubular sections; each of said semi-cylindrical sections has a generally semi-cylindrical body with a first, upper end and a second, lower end, a semi-circular top panel being positioned at said first end generally transverse to the axis of each semi-cylindrical section, each semi-circular panel having a generally axially arranged semi-circular opening concentric with the outer periphery of said semi-circular top panel, each upper panel further comprising an upwardly projecting semi-cylindrical funnel portion, each of said semi-cylindrical sections including a semi-circular lower or base panel positioned at their respective lower or base ends, each of said base panels including a generally semi-circular recess, wherein when said first and second sections are positioned to contact with each other so as to define a cylindrical tubular element, said two indentations together define a single aperture and said two outwardly projecting cylindrical funnel sections together defining a cylindrical funnel when said first and second sections are in contact with each other.

The tubular cultivation device further comprises a plastic film to which each of said semi-cylindrical tubular sections is attached, said film comprising a hinge for opening and closing said tube sections.

The semi-cylindrical tubular sections comprise means for interlocking the tubular sections to each other, one of said semi-cylindrical tubular sections having a male locking element and the other said semi-cylindrical sections comprising a female element, said male and female locking elements adapted to be engaged with each other to lock said two sections into a cylindrical tube. The male and female members can comprise a tenon and mortise, respectively, or can comprise interlocking tongue and groove elements.

The semi-cylindrical funnel sections comprise, when the two said semi-cylindrical tubular sections are locked together, a cylindrical funnel having a continuous exterior surface. The funnel comprises means for protecting the stems of plants positioned within said container when said two semi-cylindrical tubular sections are attached to each other and wherein the upper panels of said first and second semi-cylindrical surfaces comprise means for preventing penetration of said container by weeds and insects. The two tubular sections can be assembled together into a tube.

In a second aspect, the present invention provides a device for cultivating plants, said device comprising a first, semi-cylindrical tubular section. The first tubular section, in turn, comprises: (i) a generally semi-cylindrical tubular body portion; (ii) a generally semi-circular base panel attached to a lower end of said semi-cylindrical body portion, said semi-circular base panel having a generally arcuate cutout therein; and (iii) a generally semi-circular top panel attached to an upper end of said semi-cylindrical body portion, said semi-circular panel including an upwardly extending, generally semi-cylindrical member which is substantially concentric with the outer periphery of said semi-cylindrical body portion. The device also includes a second, semi-cylindrical tubular member, said second tubular member comprising: (i) a second, generally semi-cylindrical tubular body portion; (ii) a second, semi-circular base panel attached to a lower end of said semi-cylindrical body portion, said second semi-circular base panel having a generally arcuate cutout therein; (iii) a generally semi-circular second top panel attached to an upper end of said second semi-cylindrical body portion, said second semi-circular top panel including an upwardly extending, generally semi-cylindrical second funnel member which is substantially concentric with the outer periphery of said second, semi-cylindrical body portion; and the device also comprises (c) means for attaching said first and second tubular members to each other to form a cylindrical tubular plant container.

The tubular container for cultivating and automatically loading plants further comprises a hinge connecting said first semi-cylindrical tubular section to said second semi-cylindrical tubular section. The hinge comprises a plastic film which is attached to at least a portion of the outer peripheries of both of said first and second semi-cylindrical tubular sections. One of said two semi-cylindrical tubular sections includes a male member and the other of said two semi-cylindrical sections includes a female member, said male and female members being located along the edges of at least the body portions of both of said semi-cylindrical sections, said male and female members being adapted to engage each other to form a continuous tubular container when said first and second semi-cylindrical tubular sections are in abutment with each other. The male and female members can comprise, e.g., tongue and groove members, or can comprise a tenon and mortise.

A plurality of said first and second semi-cylindrical tubular sections are aligned axially with each other, wherein said upwardly extending semi-cylindrical funnel member of each of said semi-cylindrical tubular sections is positioned within the semi-cylindrical recess of an adjacent forwardly located semi-cylindrical tubular sections, wherein a plurality of said semi-cylindrical sections are adapted to be interlocked with each other when positioned on a horizontal surface.

A flexible hinge is attached to at least a portion of the respective peripheries of each of said semi-cylindrical tubular sections.

The first and second semi-cylindrical tubular sections are attached to each other to form a tubular container for holding dirt, soil, or root media and live plants or seedlings, said tubular container comprising a bottom formed by said two base panels, a central aperture formed by said two semi-circular cutouts in said base panels, a cylindrical body formed by said two semi-cylindrical body portions, an upper wall formed by said two semi-circular top panels, and an upwardly extending, generally cylindrical funnel formed by said two semi-cylindrical funnel members.

The attaching means comprise mating male and female members located along edges of each of said semi-cylindrical body portions and along edges of each of said funnel members.

BRIEF DESCRIPTION OF THE DRAWINGS

The above and other objects, features and advantages of the present invention will be more fully described with respect to the accompanying drawings, in which like reference numerals represent like parts throughout, and wherein:

FIG. 1 illustrates a tubular case, formed in accordance with the present invention, as two semi-cylindrical sections, prior to being folded into a tube;

FIGS. 2 and 3 comprise substantially perspective views of the lower and upper sides, respectively, of the tubular cultivating element formed in accordance with the present invention;

FIG. 4 is a cutaway top plan view of half-sections of a plurality of semi-cylindrical tubular elements of the present invention positioned after being horizontally filled with dirt;

FIG. 5 is a schematic plan view of a plurality of semi-cylindrical tubular container sections positioned in overlapping relationship and in a stable position; and FIG. 6 is a cut-away side view of the tubular apparatus (when erected) shown protecting a developing plant stem.

DETAILED DESCRIPTION OF THE DRAWINGS

The tubular element illustrated by each of FIGS. 1-3 comprises two symmetrical, semi-cylindrical tubular container sections 1 and 2, respectively, which are attached by an outer film 3, which forms a hinge between the two sections. As seen in FIG. 1, the film underlies the two sections and is adapted to form a substantially vertical hinge between them when the sections are erected to form a continuous-walled tube.

Each of sections 1 and 2 includes an upper panel 4 and 5, respectively. Each of the upper sections or panels is provided with respective axial semi-circular indentations 6 and 7, respectively, which have semi-cylindrical or tubular funnel surfaces 8 and 9, respectively, extending upwardly therefrom. The two funnel sections, which are best illustrated in FIG. 1, are adapted to be positioned directly adjacent each other to form a substantially continuous, cylindrical funnel or collar 10 extending upwardly from the container when erected, as best illustrated in FIGS. 3 and 6.

The base of each section 1 and 2 includes respective semi-circular bottom panels 12 and 11, respectively, as best shown in FIGS. 1 and 2. Each of these sections includes a semi-circular indentation or recess 13, 14, respectively, which when joined together form a generally circular, or other arcuately shaped, opening 15. This opening is provided to drain excess water from the tube which is formed by the joinder of these two sections.

Sections 1 and 2 which are adapted to be joined together each define an arc of approximately 180° about hinge 3 when they are assembled. When attached to each other, container sections 1 and 2 form mating tubular body sections 17 and 16, respectively, with respect to male and female interlocking elements 18 and 19, respectively, e.g., projecting and concave grooves or mortise and tenon. In other words, members 18 and 19, as best illustrated in FIG. 3 can be formed as a tongue and groove, or other conventional type which are adapted to interlock along both sides of container body sections 1 and 2 and funnel sections 8 and 9. The open tubular elements formed by sections 1 and 2, as shown in FIGS. 4 and 5, are adapted to be positioned adjacent to each other, horizontally and in a longitudinal fashion, with funnel sections 8 and 9 overlapping and overlying bottom openings 13 and 14 in a telescoping fashion, respectively, in the next adjacent container sections 1 and 2. These sections are adapted to be positioned with a jointed framework (not shown) so that they can be horizontally positioned in a stable fashion, as is illustrated in FIGS. 4 and 5.

These two piece frames connected to each other by a hinge, retain the container sections which are filed with dirt, with the overflow of dirt being removed by a pusher which equalizes the amount of dirt in each container by packing the dirt down.

After tamping the dirt into each of the half sections, seeds or seedlings can be positioned in each of the sections, prior to closing each tube, by bringing sections 1 and 2 into abutment with each other about the flexible hinge formed by film 3.

During germination of a plant which has been positioned within the two part tubular container, stem 24 will be protected by cylindrical funnel 10, and surfaces 20 and 21 will prevent any weed growth or insects from entering the container. Dirt soil, or root media 22 within the container will permit the roots to develop along the inside of the container area 23. Bottom opening 15, formed by semi-circular openings 13 and 14 in sections 1 and 2, respectively, will form a drainage aperture for draining excess water from the interior of the container; and funnel 10, formed by the semi-cylindrical sections 8 and 9 which are positioned in abutment with each other and which can each have a tongue and groove or other similar connection for bringing the two sections into abutment with each other, will protect stem 24 against insects or other adverse environmental impact, while permitting plant root or stem 24 to grow upwardly therethrough in a controlled fashion.

Bottom panels 12 and 11 and top panels 4 and 5 of the tubular elements 1 and 2, respectively, are adapted to prevent the spreading of dirt soil or root media which would otherwise occur due to the natural spreading of plant roots or water entry/erosion. In other words, a predetermined amount of dirt can be retained within the container regardless of the external environment.

During germination, as illustrated in FIG. 6, plant stems 24 will be protected by cylindrical funnel 10 and end container body surfaces 20 and 21 (FIG. 6) will prevent all growth of weeds from entering the container. Dirt soil or root media 22 within the container will permit roots to develop on the inside of tubular area 23, opening 15 will provide for drainage of water from the tube, and funnel 10 will protect stem 24 against insects or other disagreeable invasions by animals or the environment.

A simple scraper can be used to level dirt soil or root media along the edges of the receptacles; and the height of the walls of the tubular body sections corresponds to the height of the scraper.

Seeds or a seedling can be positioned along the axes of the funnel and the opening formed by semi-circular sections 6 and/or 7 via a conveyor belt (not shown) which automatically moves sections 1 and 2 in a predetermined direction.

Sections 1 and 2 are adapted to be closed and locked by the interlocking of tongue and groove or other conventional complementary male and female sections 18 and 19. These sections extend along the entire length or height of the tube body and funnel portions.

Opening 15 permits the plant to be watered and serves to drain excess water or moisture from the tubular element into the ground.

Although one specific form, dimension and arrangement of the present invention has been described in the present application, differing arrangements and dimensions of elements can be provided and still be within the scope of the present invention, e.g., the materials and method of manufacture can be changed as long as they are within the contemplation of one of ordinary skill in the art.

What is claimed is:

1. A tubular plant container adapted to be folded, filled and planted in an open, substantially horizontal position, said container comprising two substantially semi-cylindrical body sections, each of said body sections having a first end and a second end, a top panel of substantially crescent configuration formed at each of said first ends, a bottom substantially crescent shaped panel formed at each of said second ends, each of said panels having a substantially semi-circular cutout which is concentric to the outer periphery of a respective body section, each of said top panels having a substantially semi-cylindrical collar extension, each of said extensions having an end edge which is integrally formed and co-extensive with a respective top panel cutout, wherein the radius of each of said extensions is smaller than the radius of each of the cutouts which are positioned along said bottom panels, whereby a plurality of said containers are adapted to be positioned in horizontal, open positions, whereby when said containers are in said substantially horizontal open positions, the collar extension of each of said containers is telescoped into a respective bottom panel cutout of an adjacent container, such that respective top and bottom panels of adjacent containers are positioned in close proximity to each other, thereby permitting automatic filling of said plurality of containers without spilling of any filling material, the body sections of each of said containers being hingedly connected along one edge whereby said body sections are adapted to be folded together to form a substantially cylindrical container.

2. A in accordance with claim 1, wherein said two semi-cylindrical body sections are assembled into a container.

3. A container in accordance with claim 1 further comprising a plastic film to which each of said semi-cylindrical body sections is attached, said film comprising a hinge for opening and closing said tubular element.

4. A container in accordance with claim 3, wherein said semi-cylindrical body sections comprise means for interlocking said body sections to each other, one of said semi-cylindrical body sections having a male locking element and the other said semi-cylindrical body section comprising a female locking element, said male and female locking elements being adapted to be engaged with each other to lock said two sections to form said substantially cylindrical container.

5. A container in accordance with claim 4 wherein said male and female members comprise a tenon and mortise, respectively.

6. A container in accordance with claim 4 wherein said male and female members comprise interlocking tongues and grooves, respectively.

7. A container in accordance with claim 1 wherein said semi-cylindrical body sections comprise, when two said semi-cylindrical body sections are locked together, a cylindrical collar having a continuous exterior surface.

8. A container in accordance with claim 7, wherein said collar comprises means for protecting the stems of plants positioned within said container when said two semi-cylindrical body sections are attached to each other, wherein the top panels of said two semi-cylindrical body sections comprise means for preventing penetration of said container by weeds and insects.

9. A container in accordance with claim 1 wherein a plurality of containers including said semi-cylindrical body sections are adapted to be aligned axially with each other, wherein said collar extension of each of said semi-cylindrical body sections is positioned within the semi-cylindrical recess of an adjacent, forwardly located semi-cylindrical body section, wherein a plurality of said semi-cylindrical sections are adapted to be axially interlocked with each other when positioned on a substantially horizontal surface.

10. A container in accordance with claim 9 further comprising a flexible hinge attached to at least a portion of the respective peripheries of each of said semi-cylindrical body sections.

11. A container in accordance with claim 1, wherein said two body sections are attached to each other to form a substantially tubular container for holding dirt and live plants or seedlings, said tubular container comprising a bottom formed by said two bottom panels, a central aperture formed by said two semi-circular cut-outs in said base panels, a cylindrical body formed by said two semi-cylindrical body portions, an upper wall formed by said two semi-circular top panels, and an upwardly extending, generally cylindrical collar formed by said two semi-cylindrical collar extensions.

12. A container in accordance with claim 11, wherein said attaching means comprise mating male and female members located on edges of each of said semi-cylindrical body portions and on edges of each of said collar members.

* * * * *

UNITED STATES PATENT AND TRADEMARK OFFICE
CERTIFICATE OF CORRECTION

PATENT NO. : 4,813,178

DATED : March 21, 1989

INVENTOR(S) : Claude FERRAND

It is certified that error appears in the above-identified patent and that said Letters Patent is hereby corrected as shown below:

At column 1, line 19, insert ---,--- after "dirt" and after "media".

At column 4, line 58, change "filed" to ---filled---.

At column 6, line 22, insert ---container--- after "A".

Signed and Sealed this

Twelfth Day of June, 1990

Attest:

HARRY F. MANBECK, JR.

*Attesting Officer*　　　　*Commissioner of Patents and Trademarks*